Patented June 9, 1953

2,641,554

UNITED STATES PATENT OFFICE 2,641,554

PROCESS OF PRINTING TEXTILE FABRIC

Paul L. Meunier, Wilmington, Del., and Robert J. Summerill, Westville, N. J., assignors to E. I. du Pont de Nemours & Company, Wilmington, Del., a corporation of Delaware No Drawing. Application November 26, 1951, Serial No. 258,288

5 Claims. (Cl. 117—38)

This invention relates to the printing of textile fabrics. It is an object of this invention to provide an improved process for printing textile fabrics with aqueous pigment suspensions containing starch. Other objects and achievements of this invention will appear as the description proceeds.

Pigment printing of textiles with water-lacquer emulsions has progressed in recent years to a position of importance in some fields. There are certain objectionable features in the emulsion system of application, however. Textile mills prefer not to use solvents, partly because of the obnoxious and sometimes toxic nature of the solvents, and partly because the emulsion products are troublesome to remove from the application equipment. Furthermore, a thorough knowledge by mill personnel of the eccentric behavior of emulsions is required for efficient operation. Consequently, it has become desirable to overcome these drawbacks by developing a process which is applicable from an all-aqueous system.

Now according to the present invention the problem is solved by printing the fabric with an aqueous starch paste containing, in addition to the pigment, a binder of a special type and a curing catalyst, as more fully set forth hereinbelow. The printing is then developed in customary manner by curing at a temperature of 210° F. to 250° F., or by steam-aging in the optional presence of acetic acid vapors.

The special binder hereinabove referred to is a water-soluble triazone resin, obtainable by condensing at a pH of 0.25 to 4 a reaction product of urea, formaldehyde and a linear polyamine containing from two to eight carbon atoms, two primary amino groups and from zero to three secondary amino groups, each amino group being separated from the other amino groups, by two carbon atoms, said reaction product containing an average of at least 1.5 triazone rings and at least 3 methylol groups attached to nitrogen atoms per molecule of linear polyamine. The reactions involved in the synthesis of the resin and in its subsequent curing on the fiber may be considered as taking place in the following steps:

(1) Urea reacts with formaldehyde to form dimethylolurea.

$$NH_2.CO.NH_2 + 2HCHO \longrightarrow HOCH_2.NH.CO.NH.CH_2OH$$

(2) Dimethylolurea reacts with the linear polyamine, such as ethylene diamine, with the formation of triazone rings.

$$2HOCH_2.NH.CO.NH.CH_2OH + NH_2.CH_2.CH_2.NH_2 \longrightarrow$$

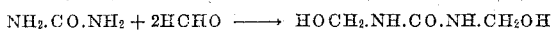

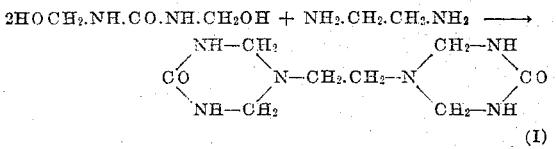

(3) This triazone compound reacts with additional formaldehyde to give a methylol derivative.

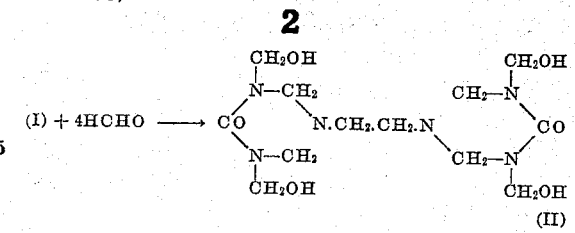

(4) Upon heating in acid solution, intermolecular condensation occurs to yield a high molecular weight product having recurring units as follows:

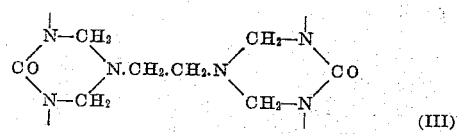

These units are linked to one another by methylene groups which are formed by the elimination of water and formaldehyde at the methylol groups. The nitrogen atoms shown with free bonds in the structure above are either connected to methylene bridges or remain attached to methylol groups.

The curing catalyst is one of the agents customarily employed to furnish acid in a printing paste, and may be aluminum chloride, zinc nitrate, ammonium sulfate, ammonium chloride, ammonium tartarate, dibasic ammonium phosphate or tartaric acid. In general, the catalyst may be any neutral to mildly acid compound which dissolves in water and becomes more acidic on heating; especially suitable are ammonium salts which lose ammonia when heated. Strong acids are also effective, but are not desirable with fiber such as cotton, which tend to be weakened by acid. If desired, the catalyst may be omitted, whereupon the steam-aging is to be carried out in the presence of acetic acid vapors.

By textile material we mean any fabric, including those made from natural fibers, synthetic organic fibers and glass fibers.

The starch may be corn starch, wheat starch, or any other starch in a form normally prepared for textile printing. The preferable amount of starch is that which gives a suitable printing viscosity, and is usually in the range of 5% to 10% by weight based on the weight of the entire paste.

Any organic pigment is operable. Of course, it must be in suitable physical form for printing, i. e., primarily of fine particle size. The amount of pigment is chosen within the range of 0.1% to 2% (based on the weight of the printing paste) to give the desired shade.

Curing may be effected by the usual drum drying or by steam- and acid-aging. The upper temperature limit is imposed simply by the limitations of the available textile drying equipment. The curing time is not critical. The 3 minute time normally employed in acid-aging (about 210° F.) is sufficient.

Our novel process imparts satisfactory fastness properties to printed fabrics. Fabrics so printed were found to have good fastness to washing, crocking, chlorine (bleach) and light. The process is also more economical than most commercial resin-pigment printing processes, and does not tender the fabric.

Without limiting our invention, the following examples are given to illustrate our preferred mode of operation. Parts mentioned are by weight.

PART I. SYNTHESIS OF THE TRIAZONE RESIN

A flask is charged with 450 g. of urea (7.5 moles), 258 g. of diethylene triamine (2.5 moles) and the mixture is heated to 80° C. 1220 g. of 37% formaldehyde solution (15 moles HCHO) made alkaline to phenolphthalein paper with sodium carbonate are added in two hours, maintaining the temperature at 80° C. The charge is stirred for one hour at 85° C., cooled to 60° C., and 810 g. of alkaline 37% formaldehyde are added. After stirring for one hour at 60° C., 1400 cc. of water are added and the charge reheated to 60° C. 308 cc. of 37% hydrochloric acid are added to reduce the pH to 1.1. The mixture is stirred at 70° C. to 72° C. for 30 minutes, after which 355 cc. of 20% sodium hydroxide are added. The product is a mobile, amber solution containing 24.8% resin.

PART II. APPLICATION TO THE FIBER

Example 1

COMPOSITION

| | Parts |
|---|---|
| Polychloro copper phthalocyanine (over 46% Cl; 20% aqueous paste) | 5.3 |
| Water | 4.1 |
| Wheat starch aqueous paste (10%) | 78.0 |
| Triazone resin from Part I | 12.0 |
| Catalyst | 0.6 |
| Total | 100.0 |

The above composition was prepared by boiling the water-starch mixture for 30 minutes, cooling, mixing in the pigment, adding the resin and catalyst and then mixing thoroughly in a high-speed mixer.

As catalysts, in various experiments using the above composition, the following were employed:

Ammonium thiocyanate
Dibasic ammonium phosphate
Ammonium sulfate
Ammonium tartrate The resulting pastes were printed onto cotton, followed by drying and then curing on a dry can at 215° F. for 6 minutes.

A fifth paste containing no catalyst at all was also printed, dried and passed through a conventional acid-ager, containing steam and acetic acid vapors, for 4 minutes at 214° F.

The shade and strength and fastness properties of the prints were satisfactory.

Example 2

COMPOSITION A

| | Parts |
|---|---|
| Polychloro copper phthalocyanine paste (same as in Example 1) | 5.3 |
| Water | 10.1 |
| Wheat starch paste (10%) | 78.0 |
| Triazone resin from Part I | 6.0 |
| Ammonium chloride | 0.6 |
| Total | 100.0 |

COMPOSITION B

| | Parts |
|---|---|
| Copper phthalocyanine (22.5% aqueous paste) | 4.7 |
| Water | 10.7 |
| (The remaining ingredients as in Composition A) | |
| Total | 100.0 |

COMPOSITION C

| | Parts |
|---|---|
| Polychloro copper phthalocyanine (same as in Composition A) | 0.53 |
| Water | 20.27 |
| Wheat starch paste (10%) | 78.0 |
| Triazone resin | 0.6 |
| Aluminum chloride | 0.6 |
| Total | 100.0 |

COMPOSITION D

| | Parts |
|---|---|
| Copper phthalocyanine (22.5% paste) | 0.47 |
| Water | 20.33 |
| (The remaining ingredients as in Composition C) | |
| Total | 100.0 |

The above compositions were prepared and printed by the procedure of Example 1. The prints were then divided into three parts and cured as follows:

1—Baked for 5 minutes at 320° F.
2—Acid-aged in steam containing vapors of acetic and formic acid.
3—Dried for 3 minutes in a hot flue-type drier at 170° F.

In every case, prints of good shade and fastness properties were obtained.

Example 3

COMPOSITION

| | Parts |
|---|---|
| Copper phthalocyanine (22.5% paste) | 4.73 |
| Water | 0.67 |
| Wheat starch paste (10%) | 78.0 |
| Triazone resin (from Part I) | 16.0 |
| Ammonium thiocyanate | 0.6 |
| Total | 100.0 |

The above composition was printed and then cured in 2 portions as follows:

1—acid-aged.
2—Cured on a steam heated dry can.

In both cases the prints had very good fastness properties.

Example 4

COMPOSITION E

| | Parts |
|---|---|
| Yellow disazo pigment obtained by coupling tetrazotized 3,3' - dichloro - benzidine to 2 moles of aceto-acetyl-o-toluidine | 4.9 |
| Water | 4.5 |
| Wheat starch paste (10%) | 78.0 |
| Triazone resin | 12.0 |
| Ammonium sulfate | 0.6 |
| Total | 100.0 |

COMPOSITION F

| | Parts |
|---|---|
| Brown naphthioindigoid pigment of U. S. P. 2,158,032 | 5.6 |
| Water | 3.8 |
| (The remaining ingredients as in Composition E) | |
| Total | 100.0 |

Each composition was printed on cotton and then cured in two portions as follows:

1—By acid-aging.
2—By drying in a dry box for 3 minutes at 170° F.

In all four cases the fastness properties and shades were good.

When the compositions of the above examples are printed upon fabrics made from acetate rayon, nylon, silk, wool, polyethylene terephthalate fiber, "Orlon"-acrylic fiber, and fiber glass, similar good results are obtained.

In all the examples hereinabove, the particular triazone resin mentioned (from Part I) may be replaced by any other triazone resin prepared as indicated in the general discussion. Typical variants of such resin are those obtained by using triethylene-tetramine, tetraethylene pentamine, or even ethylene diamine itself in lieu of the diethylene-triamine employed in Part I. Other variants result from varying the relative molar proportions of polyethylene-polyamine, urea and formaldehyde. The proportion of these reactants employed in Part I (in the order named) is 1:3:10. Other typical or operable proportions are 1:2:6, 1:2:8, 1:2:10, 1:2:12, 1:3:12, etc.

It will be noted from the above examples that the proportion of said triazone resin in the aqueous printing paste may vary from 0.15 to 4% by weight of the entire paste.

Other variations in the details of the printing formula or in the details of procedure will be apparent to those skiled in the art.

We claim as our invention:

1. A process of coloring textile fabric which comprises printing the same with an aqueous starch paste containing, in addition to pigment, a binder and a curing catalyst, and then subjecting the fabric to curing at a temperature of about 210° F. to 250° F., the binder being a water-soluble triazone resin obtained by reacting with formaldehyde and acid, at a pH between 0.25 and 4, upon a condensation product of diethylene-triamine, urea and formaldehyde, said binder being present in said aqueous paste in proportion of 0.15 to 4% by weight based on the weight of the entire printing paste, and the catalyst being a compound adapted to furnish acid at the curing temperature.

2. A process as in claim 1, the catalyst being a member of the group consisting of aluminum chloride, ammonium chloride, ammonium sulfate, ammonium thiocyanate, ammonium tartarate and dibasic ammonium phosphate.

3. A process of coloring textile fabric which comprises printing the same with an aqueous starch paste containing a pigment and a binder, the latter being a water-soluble triazone resin obtained by reacting with formaldehyde and acid, at a pH between 0.25 and 4, upon a condensation product of diethylene-triamine, urea and formaldehyde, said binder being present in said aqueous paste in proportion of 0.15 to 4% by weight based on the weight of the entire printing paste, and then subjecting the fabric to curing at a temperature between 210° and 250° F. in the presence of a catalyst which is acid at the curing temperature.

4. A process as in claim 3, the curing being effected by the aid of steam and acetic acid vapors.

5. A process as in claim 3, the catalyst being a member of the group consisting of aluminum chloride, ammonium chloride, ammonium sulfate, ammonium thiocyanate, ammonium tartarate and dibasic ammonium phosphate, and being incorporated in the aqueous starch paste prior to printing.

PAUL L. MEUNIER.
ROBERT J. SUMMERILL.

No references cited.